United States Patent [19]

Rogow et al.

[11] Patent Number: 4,575,639
[45] Date of Patent: Mar. 11, 1986

[54] FLUID TURBINE SYSTEM

[76] Inventors: Bruce I. Rogow, 3709 Merrimac Ave., San Diego, Calif. 92117; Fred Sternberg, 4702 - 16th Ave., Brooklyn, N.Y. 11204

[21] Appl. No.: 203,234

[22] Filed: Dec. 16, 1980

[51] Int. Cl.$^4$ .............................................. F03D 9/00
[52] U.S. Cl. ........................................ 290/55; 290/44
[58] Field of Search ............ 60/641.8, 641.11, 641.15; 290/44, 55

[56] References Cited

U.S. PATENT DOCUMENTS

| | | | |
|---|---|---|---|
| 1,315,595 | 9/1919 | Clark | 290/44 |
| 2,213,497 | 9/1940 | Kelly | 416/91 |
| 3,730,643 | 5/1973 | Davison | 290/55 |
| 3,822,692 | 7/1974 | Demarest | 60/641.15 |
| 4,047,833 | 9/1977 | Decker | 290/55 |
| 4,095,422 | 1/1978 | Kurakake | 290/54 |
| 4,118,637 | 10/1978 | Tackett | 290/55 |
| 4,134,708 | 1/1979 | Brauser et al. | 290/55 |
| 4,187,123 | 2/1980 | Diggs | 60/641.15 |
| 4,260,325 | 4/1981 | Cymara | 415/2 R |
| 4,278,896 | 7/1981 | McFarland | 290/55 |

FOREIGN PATENT DOCUMENTS

| | | | |
|---|---|---|---|
| 2289766 | 5/1976 | France | 415/2 R |
| 210937 | 2/1924 | United Kingdom | 415/4 |

Primary Examiner—William M. Shoop, Jr.
Assistant Examiner—W. E. Duncanson, Jr.

[57] ABSTRACT

A dual solar phenomena exploiting system comprises two main elements; one represents direct solar heat into electric power converting media, and the other indirect using air or aquatic currents in an efficient manner. Both can operate separately, independently or conjunctively.

10 Claims, 13 Drawing Figures

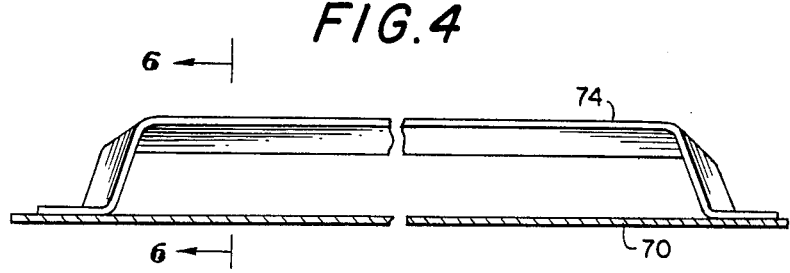
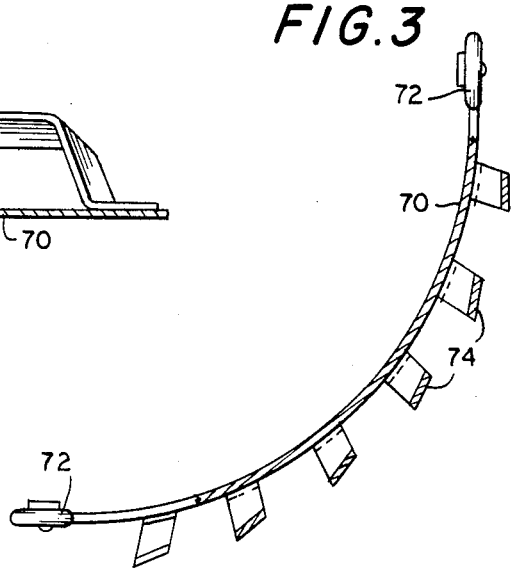
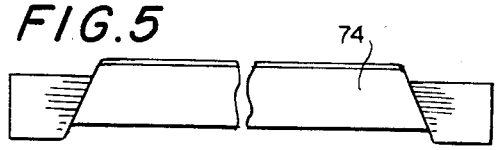
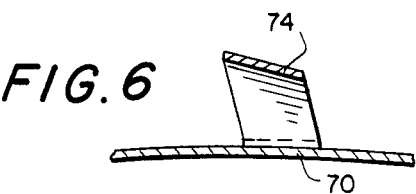
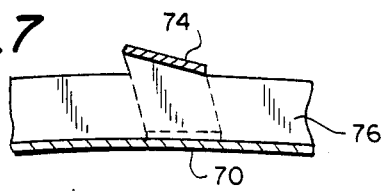
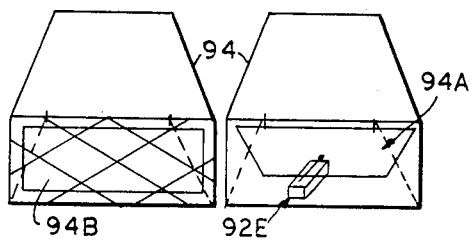
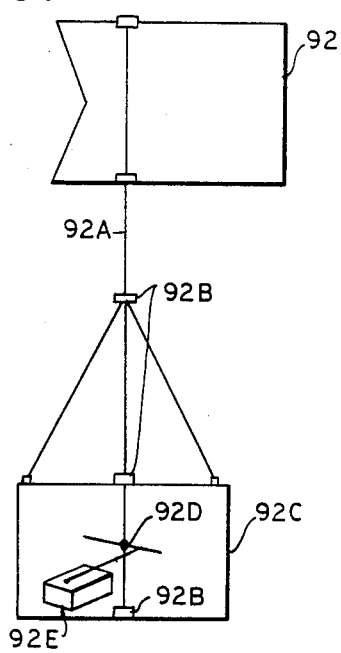
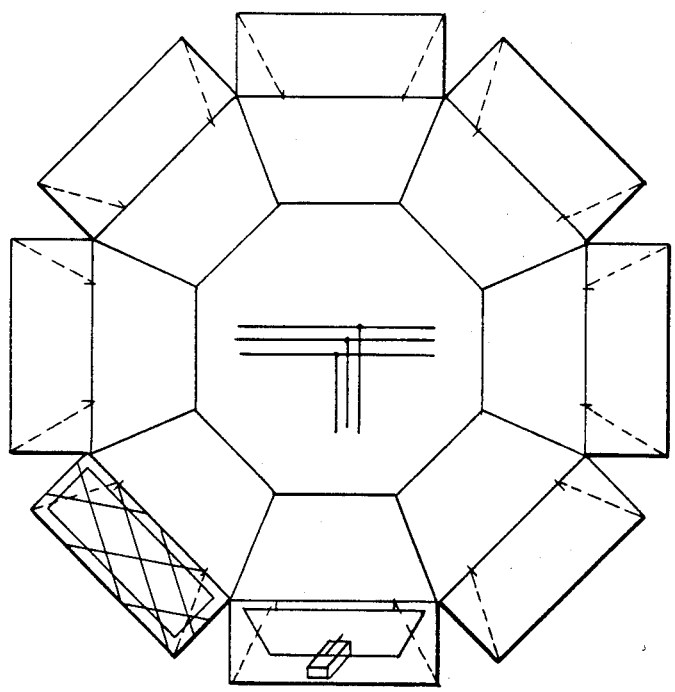

FLUID TURBINE SYSTEM

BACKGROUND OF THE INVENTION

1. Field of Invention

This invention relates to a system of preferably interlinked fluid turbines with separately operating though in conjunction with each other like or unlike structures and their appurtenances. Designed for maximum solar generated power transmission as well as the exploitation of any air, gaseous or aquatic currents that they might be exposed to. They will either by themselves or in combination with others, like or unlike themselves appropriate to the locale and or place; horizontally or vertically positioned: transmit mechanical power more efficiently than hitherto possible under the Prior Art; to the connected to them directly or indirectly electric generator(s).

The prior state of the Art is not in our belief efficient enough to exploit nature's self-replaceable resources like air, water, gaseous currents or solar radiated power to a truly fully appreciable extent, as described in the following.

2. Description of the Prior Art

1. The limited nature of the useful windward totality of exposure of the propeller type blades in spite of their wind-trapping configurations makes for a reduced productive capacity.

2. The excessive weight involved when large blades or vanes are employed in an effort to harness more of the wind; thusly requiring greater wind velocities.

3. The inherent weakness of any exposed to the elements blade or vane because of the one-sided fastening; presenting the ever-present danger of breakage and possible hurt to people, animals, or things.

4. The weathercock or wind-directional vanes, or blades have not been made utilitarian enough to move a heavier and or larger rotor automatically windward.

5. Special housings as in U.S. Pat. No. 4,057,270 for rotors tend to limit the available confluency of any air or aquatic current normal to the area and the trapped air between the blades act as a dead-weight barrier for the incoming wind hitting the blade behind it.

SUMMARY OF THE INVENTION

The invention referred to herewith relates to a system of Solar radiation and fluid currents harnessing devices, that are unique in their construction and employment of their appurtenances.

The functional capabilities will be best assessed; when a pair of upper (A) and lower (B), parallel running "Inner" annular tracks together with the encircling them, preferably on the same levels; pair of "Outer" A & B annular tracks are envisioned. The inner tracks serve as a path for the rotors to rotate in or on; and the outer tracks; as a path for the; by microswitches controlled; in its movements; windshield with its components to gyrate along.

BRIEF DESCRIPTION OF THE DRAWINGS

FIGS. 3–10 are views showing details of the present invention.

DETAILED DESCRIPTION OF INVENTION

The present invention comprises four different units given to solar radiation exploitation. All in one way or another comlementing each other; either by working successively, independently or in unison.

1. The Solaroid rotor or propeller blades are equipped with bearing wheels at their outer points running in, or along their "inner" preferably in pairs track(s).

2. The shielding unit with its adjuncts, running along or in its own "outer" on a parallel, or not, level to the thusly encircled "inner" track(s) shielding the vanes or blades upon their windward return and moving in unison with the rotor to its most advantageous for its performance; position.

3. Preferably micro switch equipped Solaroid Weathercocks acting when their vanes are impinged upon by the wind to energize their respective micro switches; thereby activating the shielding mechanism referred to in paragraph two, to move where it can best shield the blades upon completion of their rotation(s) from a deterrent at that point; wind.

4. A triangular almost isoceles in shape; except for the vertex angle being flat; structure; looking somewhat like a flattened at the top copula, or like a saw horse; with walls and a flat bottom; having affixed to themselves solar radiation-sensitive materials or instrumentation; mounted on top of the rotor(s) or multi-rotor frame(s) and preferably following the sun by either having a photo electric cell affixed to it in a conventional manner or wherever possible and desirable being adjusted manually.

FIG. 1

Figure 1:
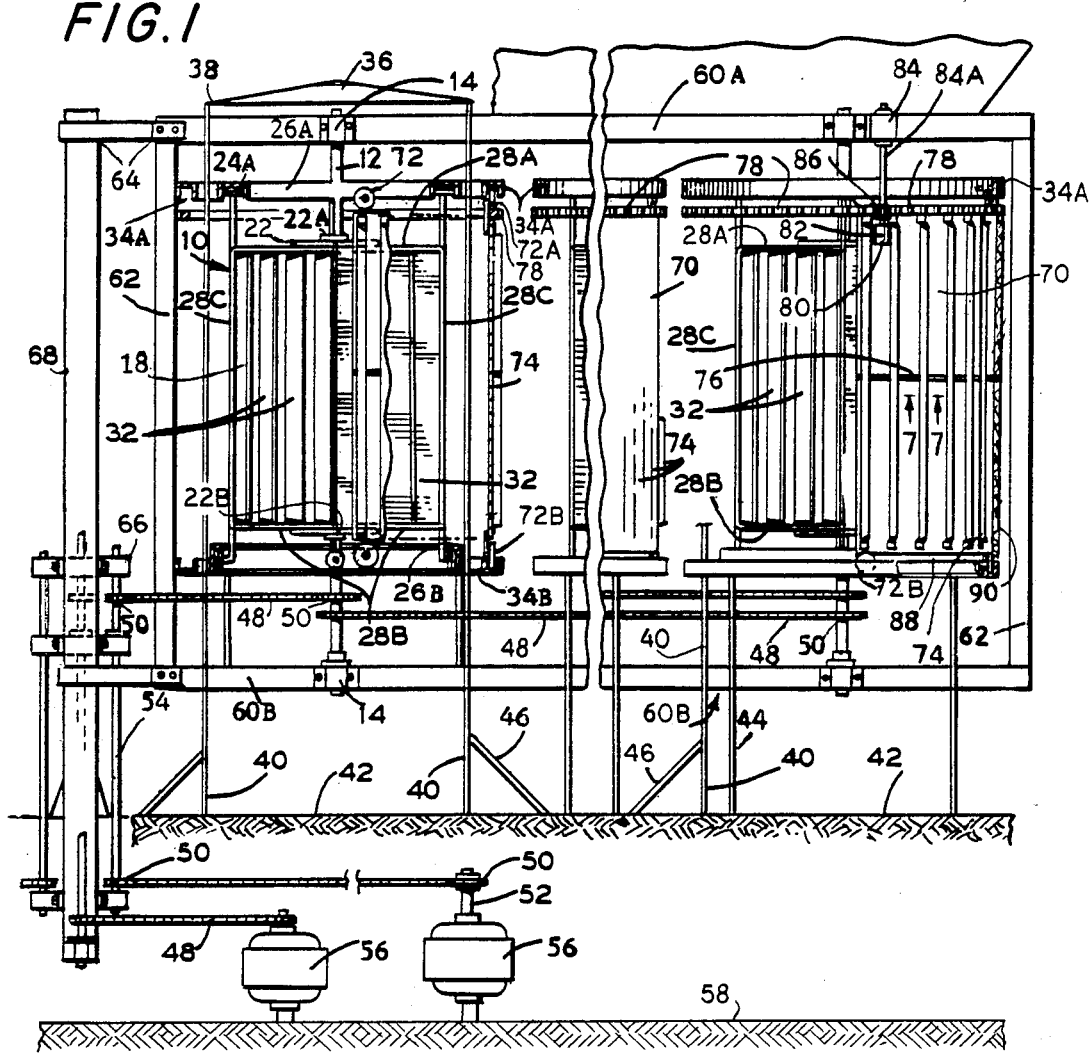
FIG. 1 is an elevation view of the apparatus according to the present invention.
Figure 11:
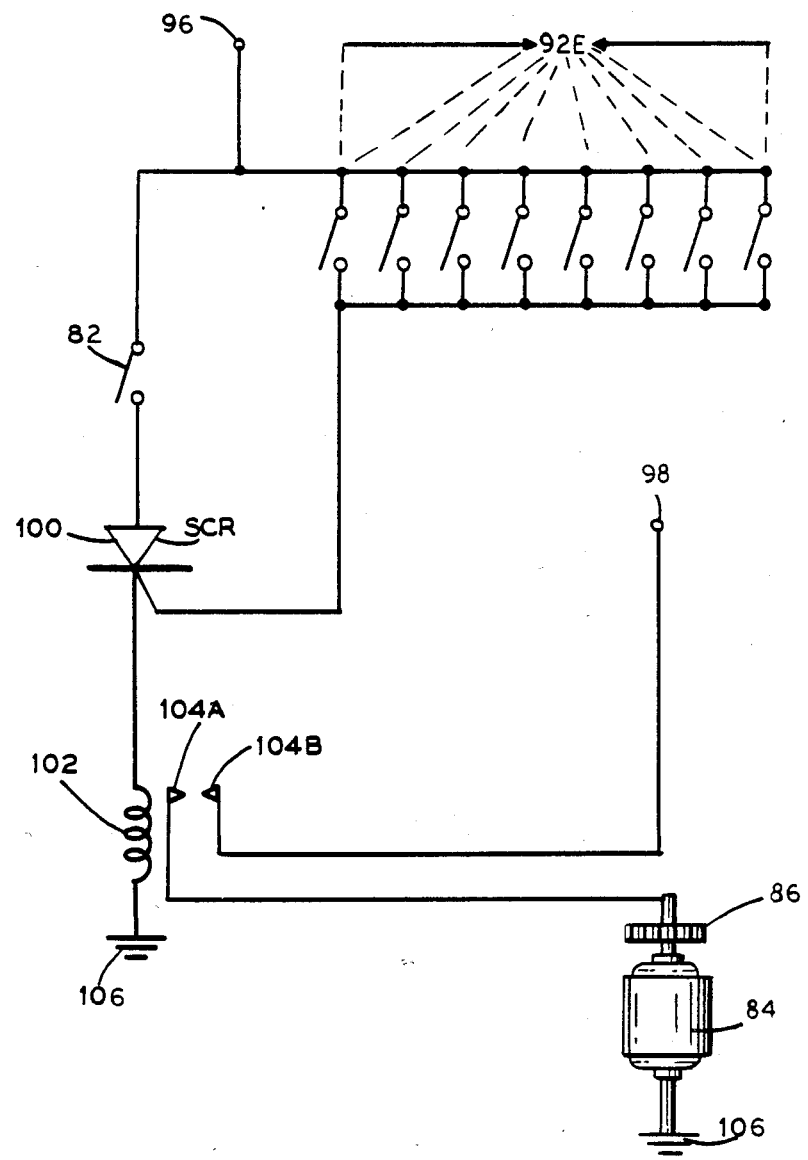
FIG. 11 is a schematic circuit diagram according to the present invention.
Figure 12:
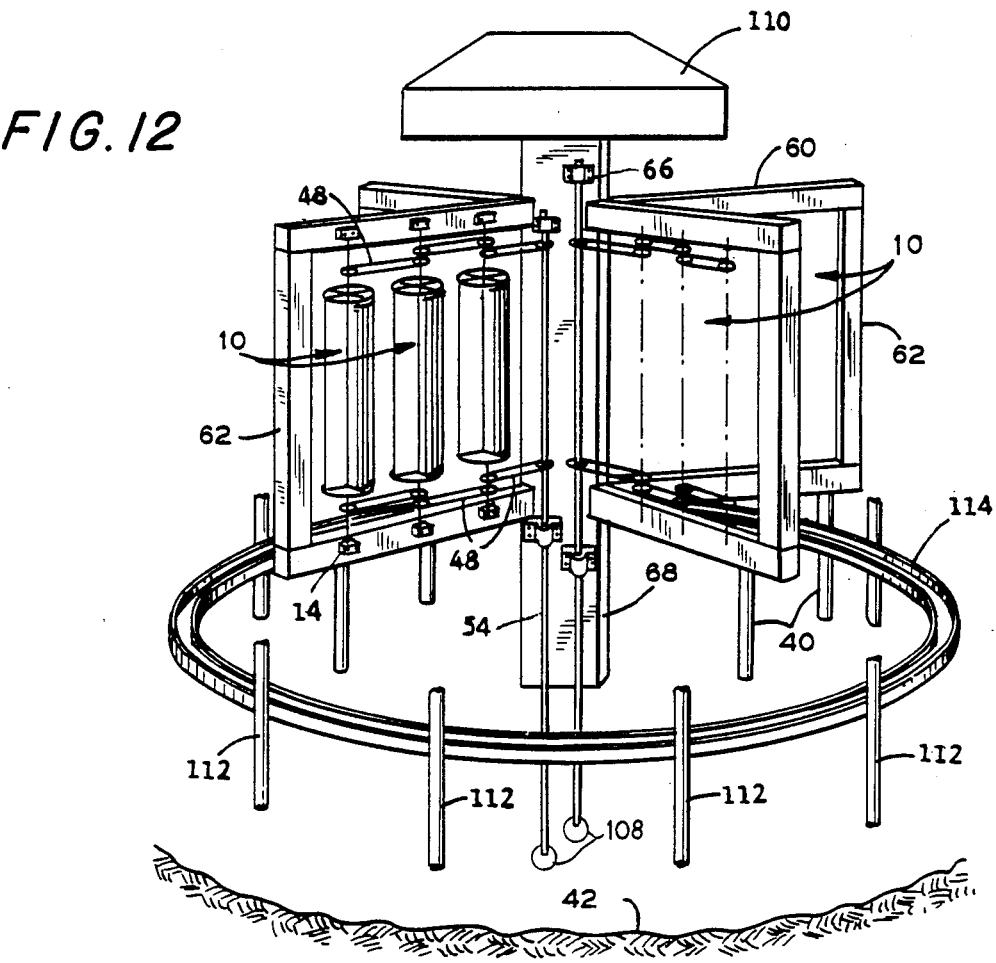
FIG. 12 is an elevation view of an alternate embodiment of the invention.

10—Rotor. Clock or counter clockwise rotation. Functioning separately or in combination with other 10(s); in either horizontal or vertical ways and positions, depending on the need of the locale and or choice of place. Facing the currents from whatever source and or blocking some beneficially with the help of adjunct parts connected directly to a 56 or through a 54 to it. Greater accelleration will be achieved by linking a plurality of 10 through appropriate in size 50 and or 50A to 54 and enlarging the circumference of the 10(s) relative to their distance from 54. FIGS. 1 and 11.

12—Rotor shaft.

14—Bearings on both ends of 12.

Figure 2:
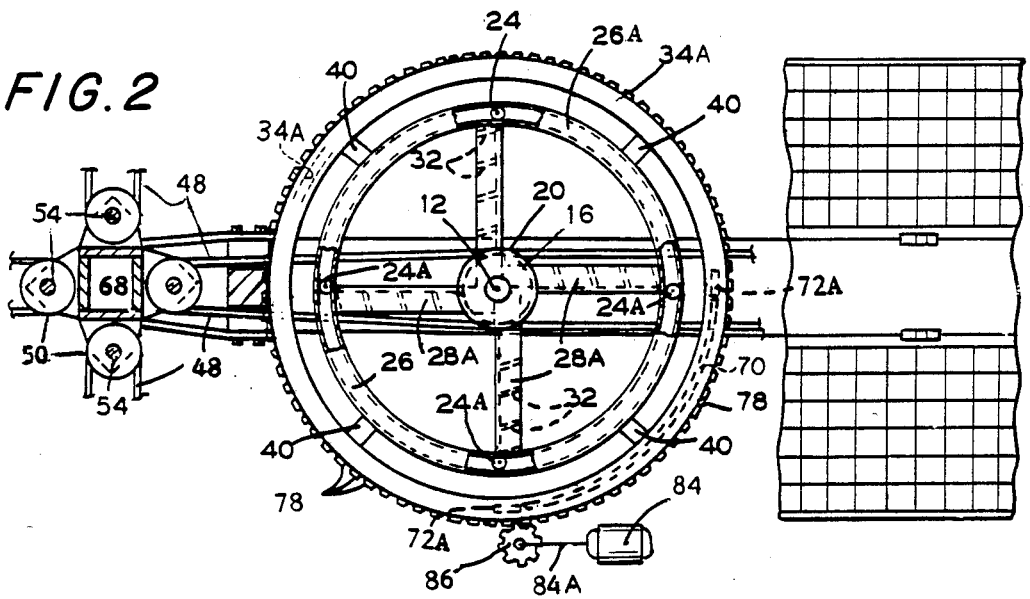
FIG. 2 is a plan view of the apparatus.

16—Cylinder, Slotted or not, Fastened by conventional means to 12. FIG. 2.

18—Vanes. Coaxial to 12. Fastened through conventional means to any or all or 12, 16, and or 20 FIGS. 1 and 2.

20—Disks or plates, upper and lower, conventionally affixed to 12, 16 and 18.

22—Key-wayed collars. upper and lower, fastened to 12, securing 20.

24—Bearing wheels affixed to the outer points of 18 or for that matter to any rotor, propeller or fan blade of any shape or material, rolling along an annular track and thereby steadying them in their rotation.

26—Inner annular tracks A and B Encircling 10 and fastened by conventional means to 40.

28—Frame of 18. Consisting of two isosceles metal, wood or plastic triangles A and B which are flaring away in a planar fashion flange-like from 12, extending over and under both sides of the respective top and bottom edges of 18 and joining 28C which is perpendicular to it and them; with their base ends fastened to them in addition to their points of contact with 12, 14, 16, 18 and or 20 in a conventional manner.

30—Bracing or backing in conventional materials and ways; behind 18.

32—Slanted, preferably longitudinally placed in the embodiment of 18, directed outwardly corrugations, or partitions.

34—Outer annular tracks A and B joined through 40 to 26.

36—Copula above 10 when desired and when same is to function vertically and separately, singularly or in tiers.

38—Conventional fastenings to 40 or 44.

40—Posts fastened to and between 26 and 34 and grounded at 42.

42—First level or platform.

44—Support posts. Also in lengths suitable for the support of 36.

46—Support legs for 40 and 44 affixed to same and to 42 in a conventional manner.

48—Roller chain. Interchangeably placed for greater mechanical power transmission to 56, preferred to any other transmission media.

50—Sprocket wheels, or spur gears 50A placed interchangeably in pairs over 12 to be substitutively used when either 50 or 48 or both are not available. In that event they should be a part of a wheel-like structure meshing into each other with the hub encompassing 12, 54 and or 52 fastened to same in a conventional manner, preferably at the same points where 50 would be if it were available.

52—Generator shaft.

54—Main drive(s).

56—Generator(s).

58—Ground floor. Preferred location for 56.

60—A and B Poly Rotor frame, top and bottom parts joined by 62 FIGS. 1 and 11, consisting of either one or more rods, bars or pipes with bearing sockets for 12, inside brackets or clamps, affixed to them, or preferably planks, metal plates or any other suitable material into or unto which sockets for bearings can be affixed.

62—Two sidewalls adjoining 60A and B supported by 44 in a conventional way.

64—Conventional type fastenings.

66—Pillow blocks for 54.

66—Column also FIG. 11. Hollow or not, of any suitable preferred shape accomodates 54(s). FIGSS. 1, 2 and 11.

70—Windshield, Co-joined with 78. Both moving or stopping in unison with their component parts; along 34A and B when activated or stopped by their respective microswitches 82 and 92E.

72—Bearing wheels A and B. Running concurrently in their respective paths 34A and B. 72A are fastened unto or into the planar embodiment of 78 beneath 34A which serves as their path; and 72B affixed by conventional means to 88, which is a parallel to 78 ring, to which it is linked by a plurality of 90(s) use 34B as their running path.

74—Louvered or slotted section of 70. FIGS. 1, 3, 4, 5 and 6 fashioned in a slanting clock or counter clockwise manner.

76—Supportive ribbing, Fittingly notched. Horizontally or vertically fastened between 70 and 74 depending on the position of 10.

78—Spur Wheel. FIGS. 1 and 2. Extends above and beyond the edge of 70 and moves by the action of 92E and stops when 82 is impinged upon by the wind.

80—Box or cone-like projection fastened by conventional means to the front side, right or left of 70, depending on 70's clock or counter clockwise setting; has a blade affixed to a located inside it spindle 80A which revolves when impinged upon by the wind, thusly energizing the adjacent to it 82 causing 84 to stop and with it all movement by 70 and 78.

82—Micro Switch, in a closed position inside 80; when energized by 80A; it stops 78 and its appliances through the play of 86 into it.

84—Motor. When activated by 82 will stop rotation of 78 and its appurtenances through the mounted on its shaft 84A pinion wheel 86.

86—Pinion Wheel.

88—Ring. Linked to 78 by a plurality of 90(s) fastened to same in a conventional manner; it also has a number of 72B(s) affixed to itself and pointing downward for travel along 34B.

90—Posts.

FIG. 2

Top view of 10 without 36. Showing its 48 to 54 linkage and indicating the line of travel for 72A which are fastened in a functionally upward position to the planar embodiment of 78, rolling along, on or in 34A located above.

FIGS. 3, 4, 5, 6 and 7

Are planar views and profiles of 70 and 74.

FIG. 8

92—Weathervane structure. Blade has an unencumbered exposure to the wind, and is seated with its affixed to it spindle 92A through bearing sets 92B in its enclosure 92C and having a cross bar 92D adjacent to micro switch 92E which it energizes by striking its tip or wheel when made to turn by the impingement of the wind on itself; thusly activating 78, causing it; to move with its appurtenances till stopped by the wind's impingement on 80A as same moves into its path.

FIG. 9

94—Weather vane enclosure. Preferably oblong in shape. Having an horizontally elongated orifice and preferably receding somewhat deltaically to the back. It accomodates a hinged or suspended in a conventional manner blade 94A, positioned near its wire-screen capped aperture 94B in front of the adjacent to it micro switch 92E. When 94A is impinged upon by the wind; it swings back; striking 92E, thusly energizing it and through its circuitry as shown in FIG. 10, causing 78, FIG. 1 and its appurtenances to move till stopped by the wind's impingement on 80A.

FIG. 10

A plurality of 94(s). Arranged as shown; or stacked vertically, multi-layerdly; with the apertures facing preferably 8 points or more of the compass affording same a better defined wind-facing capability.

FIG. 11

Diagram for FIG. 10.
96—Power source. 12 Volt battery or any D.C. current available. Showing eight 92E(s) N. O. in line and 82 normally closed.
98—Power source for 84 FIG. 1.
100—S C R. Silicon controlled Rectifier.
102—Relay.
104—Contact points.
106—Ground.

FIG. 12

Circulon Multi-Rotor Frame Unit

108—Holes through the flooring. With or without bearings in them for 54 to go through when same are outside the columnar or other supporting structure.
110—Copula larger than 36, FIG. 1. Corrugated or not, serving as a support base for solar-heat or light-sensitive chemicals and or instrumentation, should same be affixed to it by conventional means.
112—Poles at the outer periphery. Serving as support for 114 and as a supportive in a conventional manner hook-on for 62 FIG. 1.
114—Annular tracks fastened by conventional means at any point to 112 and to the flooring 42 aiding same structurally as well as creating a medium for any protective material to be attached to it for protection against the wind and should some corrective changes or maintenance work be required.

FIG. 13

The Solaroid Instru-Chem Holder

Figure 13:
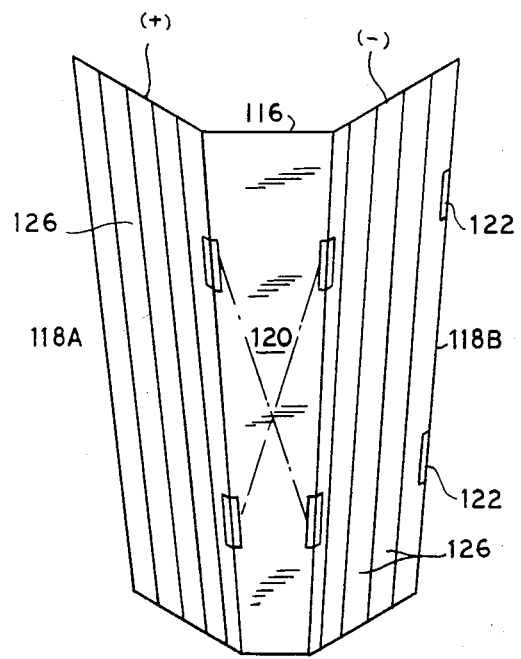
FIG. 13 is a solar panel as used in the present invention.

116—Delta-shaped bottom.
118—A and B Inclinable walls.
120—Conventional hinges or loops making 118 adjustable.
122—Conventional fastening devices and or suitable holes or slots to accomodate either ropes or chains slung between 118 and 42 and adjustably fastened in a conventional manner, or knuckle-jointed arms; linked to a conventionally fastened to 42 swivelling device; aiding in the adjustability of 118A and B.
124—Air cylinders ringed or looped at both ends fastened in a knuckle-jointed manner to suitable commercially obtainable devices at the proper for the respective installation distance(s) at points 42 and 122 and serving through their piston-kinetics compressor(s), solenoid valves and photo-electric cells all in or on line in a conventional manner to control the degree of incline of 118A and B.
126—Fastening devices for photo-voltaic cells and or other heat sensitive items or chemicals solid or fluid in nature.
128—Photo-electric cell in proximity of FIG. 13.
130—Solenoid valve mounted in a conventional manner and controlling the piston-mobility of 124.

The invention may be summarized as follows: a most efficient fluid current absorptive capacity system; comprising Fluid Turbines and other aids for the generation of electric power. Enumerated below are claims pertaining to the present invention.

We claim:
1. A fluid turbine system comprising:
a vertical axis rotor;
a plurality of vanes driving said rotor;
an arcuate shield movable on pair of concentrically external to said vanes; tracks;
said shield controlled in response to wind direction;
said shield comprising externally placed, horizontally bracketted, vertical louvers as means to guide fluid current along the surface of said shield, the outlets of said louvers being parallel to and outside of said shield.

2. A fluid turbine system comprising:
a plurality of vanes driving said rotor;
an arcuate shield movable on tracks concentrically external to said vanes;
said shield controlled in response to wind direction;
wind direction means comprising a plurality of chambers; facing different points of the compass with their respective orifices;
each one of said chambers includes a wind responsive spindle that on being moved by a fluid flow, will activate an electric switch transmitting power to a motor for said shield.

3. The fluid turbine system of claim 1 wherein said arcuate shield comprises externally placed, horizontally bracketted, parallel to itself, louvers;
said shield being affixed to a corresponding section in one of a pair of parallel positioned cirumgyratory bands;
said bands being spaced apart, having a plurality of vertical bars holding them and the shield together;
said bands having a spur gear affixed to one of their circumferences;
said spur gear spanning over said shield adjacent to its horizontal edges;
said shield fitting into a recess made into said bands accomodating its horizontal width and thickness;
said bars being affixed to the inner horizontal leg or backside of said bands;
said bands having casters affixed to their respective horizontal areas;
said shield further having affixed about its horizontal middle a bar;
said bar having one long, notched horizontal edge matching the vertical edges of said louvers;
said shield further having a pair of parallel concentrically external to said vanes, fixedly positioned tracks; said bands with shield, vertical bars, and casters forming a movable held in between said tracks, rotating unit;
said rotating unit controlled in response to wind direction.

4. The fluid turbine system of claim 3 wherein said arcuate shield together with said bands and spur gear is controlled in response to wind direction;
wind direction means comprising a plurality of chambers;
said chambers facing different points of the compass with their respective orifices;
one each of said chambers including a wind responsive spindle suspended over an electric switch;
said switch being energized when said spindle is impinged upon by the wind;
said shield further having an electric motor affixed to one of said tracks;
said motor having a pinion gear about its shaft.

5. The fluid turbine system of claim 4 wherein said spur gear together with said shield and bands is set in motion by the action of one of said energized switches on the motor;

said motor supplying motive force to said arcuate shield and bands via a pinion gear about its shaft;

said pinion gear meshing into the spur gear will also stop said shield's motion via a spindle and switch located in a chamber; said chamber affixed to said shield's embodiment;

said spindle when impinged upon by the wind will energize the switch beneath it stopping said shield's motion.

6. The fluid turbine system of claim 1 wherein said vanes further having a pair of parallel upper and lower triangular in shape frame members affixed to the respective upper and lower horizontal edges of said vanes;

said upper and lower frame members serving as fastening points for spaced away, and parallel to the front of said vanes, partitions;

said frame members having a hub in their respective apex's;

said hub fitting over a nipple-like projection central to the plate-like end-closures of a sectionalized cylinder surrounding a shaft central to said rotor;

said nipple-like projection being central to the end-closures of said cylinder;

said cylinder further having full-length horizontal projections bent outward from its embodiment;

said cylinder's projections serving as fastening points for said vanes;

said frame members joining a third vertical frame member at their distal points;

said distal points forming angles to which casters are movably affixed;

said casters running in or along a pair of fixedly positioned parallel tracks;

said tracks serving said vanes steadying them in their rotation.

7. The fluid turbine system of claim 6 wherein said cylinder is fastened singularly or plurally about a vertical immoveable shaft;

said cylinder rotating clock or counter clockwise in line with its rotor's rotational direction;

said cylinder further having a nipple-like projection central to its end-closures;

said nipple further having a sprocket about itself;

said sprocket linked via a roller chain to a maindrive;

said maindrive linked to either the armature or the field windings of a generator.

8. The Fluid Turbine System of claim 1 wherein said rotor comprises a vertical shaft;

said shaft having a sectionalized cylinder about said shaft;

said cylinder having a plurality of vanes (panels) affixed to said cylinder;

said panels rotating when impinged upon by prevailing winds.

9. The Fluid Turbine System of claim 1 wherein said rotor's shaft has bearings on both of its ends;

said shaft with its bearing equipped ends positioned in a frame, linked via endless roller-chain and sprocket combinations on alternate levels to a plurality of like rotor shafts;

said rotor shafts being linked via a main drive to an electric generator(s).

10. The Fluid Turbine System of claim 8 wherein said shaft has a plurality of rotors in a skip-tier fashion clock or counter-clockwise movably affixed about itself;

said rotors being linked to respective main drives via sprocket and chain combination media.

* * * * *